United States Patent
Lin

(10) Patent No.: US 7,853,114 B1
(45) Date of Patent: Dec. 14, 2010

(54) REDUCED USER RESPONSE TIME DURING SIMULTANEOUS PLAYBACK AND RECORDING FOR RECORDABLE DVD

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 3159 days.

(21) Appl. No.: 10/129,602

(22) PCT Filed: Nov. 10, 2000

(86) PCT No.: PCT/US00/30912

§ 371 (c)(1),
(2), (4) Date: Nov. 22, 2002

(87) PCT Pub. No.: WO01/35646

PCT Pub. Date: May 17, 2001

Related U.S. Application Data

(60) Provisional application No. 60/164,791, filed on Nov. 10, 1999.

(51) Int. Cl.
*H04N 5/91* (2006.01)
*H04N 7/00* (2006.01)

(52) U.S. Cl. .............................. 386/46; 386/68; 386/95

(58) Field of Classification Search .................. 386/6–8, 386/33, 68, 111, 112, 125, 126, 46, 95; 348/419.1; 369/30.23; 710/52, 53, 56; 725/94
See application file for complete search history.

(56) References Cited

U.S. PATENT DOCUMENTS 4,977,550 A * 12/1990 Furuya et al. ............ 369/30.23

5,585,931 A   12/1996 Juri et al. .................... 386/33
5,675,383 A * 10/1997 Yagasaki et al. ......... 348/390.1
5,706,388 A *  1/1998 Isaka .......................... 386/125

(Continued)

FOREIGN PATENT DOCUMENTS

| EP | 460 751 A2 | 12/1991 |
| EP | 726 574 A2 | 8/1996 |
| EP | 866 461 A2 | 9/1998 |
| EP | 887 799 A2 | 12/1998 |
| WO | 99/33265 | 7/1999 |

OTHER PUBLICATIONS

Masahiro Kageyama et al., *A Free Time-Shift DVD Video Recorder*, Aug. 1997, IEEE Transactions on Consumer Electronics, vol. 43, No. 3, pp. 469-473.
Search Report.

*Primary Examiner*—Thai Tran
*Assistant Examiner*—Hung Q Dang
(74) *Attorney, Agent, or Firm*—Robert D. Shedd; Robert B. Levy; Jorge Tony Villabon

(57) ABSTRACT

A method and apparatus for controlling simultaneous recording and playing back of data onto a disc medium. In response to a user generated pause-resume command, the apparatus can firstly buffer in a writing buffer a plurality of video object units to be recorded onto a disc medium. In addition, the apparatus can selectively pause the buffering of additional video object units to the writing buffer to prevent the writing buffer from overflowing. Further, the apparatus can secondly buffer these additional video object units in a navigation pack buffer. In one arrangement, the size of the cells containing the video object units can be reduced thereby reducing the capacity requirements of the navigation pack buffer. Moreover, the apparatus can reduce the bit rate of the incoming bitstream containing the video object units. Alternatively, the navigation pack buffer and the writing buffer can be logically combined to form a single data storage medium.

16 Claims, 6 Drawing Sheets

U.S. PATENT DOCUMENTS

| | | | |
|---|---|---|---|
| 5,729,280 A * | 3/1998 | Inoue et al. | 725/101 |
| 5,737,481 A * | 4/1998 | Gushima et al. | 386/113 |
| 5,870,523 A * | 2/1999 | Kikuchi et al. | 386/95 |
| 5,923,869 A * | 7/1999 | Kashiwagi et al. | 713/501 |
| 6,130,988 A * | 10/2000 | Jeong | 386/125 |
| 6,137,954 A * | 10/2000 | Sawabe et al. | 386/95 |
| 6,222,979 B1 * | 4/2001 | Willis et al. | 386/46 |
| 6,233,389 B1 * | 5/2001 | Barton et al. | 386/46 |
| 6,308,006 B1 * | 10/2001 | Yamamoto et al. | 386/96 |
| 6,654,539 B1 * | 11/2003 | Duruoz et al. | 386/68 |
| 6,693,857 B1 * | 2/2004 | Willis | 369/30.23 |
| 6,839,500 B2 * | 1/2005 | Bae | 386/68 |

\* cited by examiner

REDUCED USER RESPONSE TIME DURING SIMULTANEOUS PLAYBACK AND RECORDING FOR RECORDABLE DVD

This application claims the benefit under 35 U.S.C. § 365 of International Application PCT/US00/30912, filed Nov. 10, 2000, which claims the benefit of U.S. Provisional Application 60/164,791, filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer's absence for presentation at a later, more convenient time. This is referred to as time shifting the program. At other times, the viewer may be called away while he is watching a program that is not being recorded. If the viewer owns a conventional video cassette recorder, the viewer may begin recording the program during the interruption. The viewer, however, must wait until the program is completed to watch the remainder of the program in a proper time sequence. A further complication is that the time to complete the recording can be excessive depending on the length of the broadcast. This can result in the viewer ignoring the interruption or missing significant portions of the program.

To overcome this problem, a DVD video recorder can incorporate a pause feature. When activated, this setting, similar to other conventional video recording machines, allows the viewer to record incoming video. Significantly, however, when the pause-resume feature is activated, the DVD video recorder jumps back to that portion of the program where the pause was initiated to commence playback yet the recorder continues to record incoming video. As a result, the viewer, if interrupted for any number of reasons, can watch a program in its entirety without having to wait for the original broadcast to end.

Although it may appear to be simultaneous, the DVD recorder cannot read and write data at the same time. Thus, to achieve seamless playback and recording, the DVD recorder must alternate between recording data on the disc and reading this data. The time allotted for either reading or writing data is determined, at least in part, by the limited size of the DVD recorder's read and write data buffers. As a consequence, the recorder must constantly switch between reading and writing to avoid buffer overflow or underflow.

Typically, if the DVD recorder's read and write data buffers have a capacity of roughly 2.1 Mbytes and the bit rate is at a maximum bit rate of 8.35 Mbits/sec, then the DVD recorder can have a capacity that provides approximately two seconds for one reading or writing step plus the time required to position the DVD recorder's read/write head. For example, once a writing step is completed, the DVD recorder has around two seconds to move its read/write head into the proper reading position, read a portion of data and then move its read/write head back to perform another writing step. After that time, if the DVD recorder is not designed properly, then buffer underflow and/or overflow may occur. The foregoing timing assumes the bit rate is at a maximum of 8.35 Mbits/sec. Under normal operating conditions, a properly designed DVD recorder can achieve seamless playback and recording, even at this maximum bit rate. Significantly, however, if the system is required to operate in a trick mode while the forgoing reading and writing is taking place, certain problems may occur due to the faster consumption of data stored in the buffers and/or additional data reading requirements. In particular, the DVD recorder runs the risk of losing data from overflowing the writing data buffer due to the increased time spent reading data.

During the reading steps, the writing data buffer receives and stores data to be written onto the disc. Once a reading step is completed, the DVD recorder will shift its read/write head back to a position on the disc to begin another writing step thereby allowing the writing buffer to empty. If the DVD recorder receives a trick mode command, it commonly will be necessary to read additional data from the disc. However, as the reading step is nearing completion and the writing buffer is nearing capacity, the DVD recorder will not extend the reading step to perform the trick mode. Instead, the DVD recorder will move its read/write head to begin the writing step to prevent writing buffer overflow. As a result, the viewer will experience a delay in the initiation of the trick mode.

Further compounding the problem is the additional time required to read during a trick mode. Since the DVD recorder skips pictures during certain trick modes such as fast-forward or fast-reverse, the DVD recorder must read a greater amount of data during the reading steps to compensate for the faster speed at which these pictures are processed. Thus, the DVD recorder must spend a significant amount of time reading data to prevent underflow of the reading buffer. In response to the lengthier reading steps, it may be desirable to have the DVD recorder empty the writing buffer before initiating a trick mode, even if the data in the buffer is substantially lower than maximum capacity. This additional writing step can increase the system response time for performing the trick mode. This problem can be particularly significant where a video segment contains relatively high bit rates.

A similar user response time problem can occur when, during a pause-resume mode, a user causes the system to discontinue playback of the current program and instead play back video from another location on the disc. In this case, it may again be desirable to empty the writing buffer before beginning the reading step, which can result in a delay.

In order to overcome the delay in response time caused by performing a writing step before beginning a trick mode, a second writing buffer can be implemented into the DVD recorder. Adding such a buffer would allow the DVD recorder to initiate trick modes with no delay because any excess data from the first writing buffer would merely overflow into the second writing buffer. This solution, however, is not entirely satisfactory because adding a second buffer increases the costs of the DVD recorder and increases the DVD recorder's bus load. Thus, what is needed is an approach which accommodates the additional write data which can accumulate during the pause-resume mode so as not to increase user response time, but without incurring significant additional expense and bus load.

SUMMARY OF THE INVENTION

The invention features a method for reducing user response time during simultaneous playback and recording in a recordable disc medium device. The recordable disc medium device can have a writing buffer for temporarily storing video data to be recorded on a disc medium and a navigation pack buffer supplying data to the writing buffer for storing video data requiring future data address information. In one arrangement, the method includes the steps of: in response to a pause-resume command, temporarily storing a plurality of video object units in the writing buffer wherein the plurality of video object units can be recorded on the disc medium; selectively pausing the transfer of additional video object units to the writing buffer to prevent overflow of the writing buffer; and temporarily storing the additional video object units in excess memory contained in the navigation pack buffer to prevent loss of video data.

According to one aspect of the above method, the writing buffer and the navigation pack buffer can be provided as a single data storage medium. Under this arrangement, the writing buffer and the navigation pack buffer can be logically combined.

In another arrangement, the method can further include the step of resuming the transfer of data from the navigation pack buffer to the writing buffer after resumption of a disc writing process. In addition, the method can further include the step of shrinking the size of one or more cells containing the plurality of video object units thereby reducing the capacity requirements of the navigation pack buffer. In another aspect of the invention, the method can further include the step of lowering the bit rate of the video data to prevent overflow of the writing buffer or the navigation pack buffer.

In another aspect, the invention also features a recordable disc medium device for reducing user response time during simultaneous playback and recording. In one arrangement, the invention includes: a writing buffer for temporarily storing video data to be recorded on a disc medium, wherein the writing buffer, in response to a pause-resume command, temporarily stores a plurality of video objects therein, and the plurality of video objects can be recorded on the disc medium; a navigation pack buffer supplying data to the writing buffer for storing video data requiring future data address information; control circuitry for selectively pausing the transfer of additional video object units to the writing buffer to prevent overflow of the writing buffer; and excess memory contained in the navigation pack buffer for temporarily storing the additional video object units to prevent loss of video data.

In one arrangement of the above device, the writing buffer and the navigation pack buffer can be provided as a single data storage medium. Under this arrangement, the writing buffer and the navigation pack buffer can be logically combined.

In another arrangement, the control circuitry can resume the transfer of data from the navigation pack buffer to the writing buffer after resumption of a disc writing process. In addition, the size of one or more cells containing the plurality of video object units can be reduced thereby reducing the capacity requirements of the navigation pack buffer. In another aspect of the above device, the control circuitry can lower the bit rate of the video data to prevent overflow of the writing buffer or the navigation pack buffer.

DETAILED DESCRIPTION OF THE PREFERRED EMBODIMENTS

Recordable DVD Device

Figure 1:
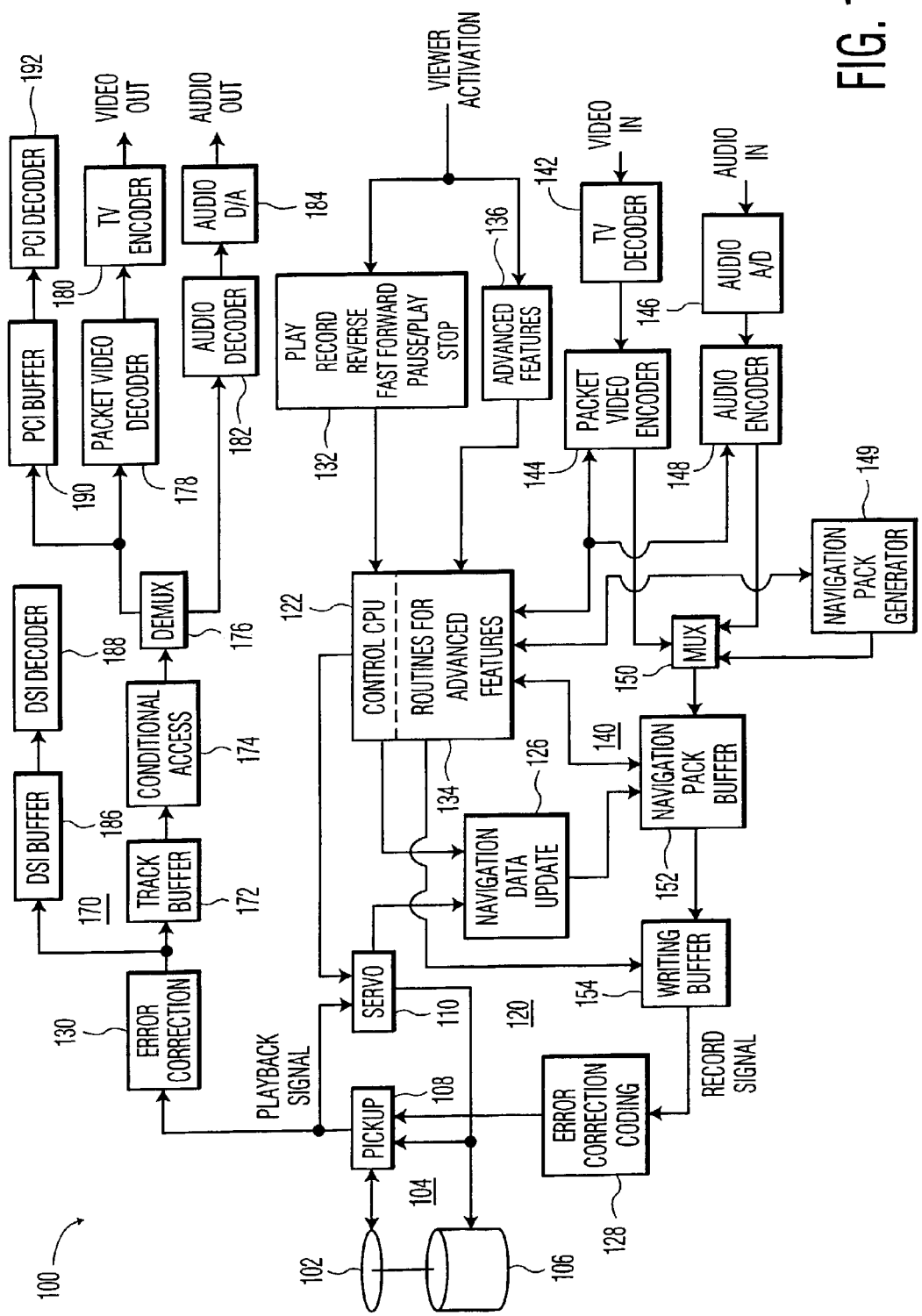
FIG. 1 is a block diagram of a rewritable DVD device that can be provided with one or more advanced operating features in accordance with the inventive arrangements herein.

A device 100 for implementing the various advanced operating features in accordance with the inventive arrangements taught herein utilizes a rewritable disc medium in accordance with the inventive arrangements is shown in block diagram form in FIG. 1. The rewritable disc medium is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc 102. A laser on the pickup assembly 108 burns spots onto a spiral track on the disc 102 or illuminates spots already burned onto the track for recording and playing back video and/or audio program material. For purposes of understanding the invention, it is irrelevant whether the disc 102 is recordable on one or two sides, or in the event of a double-sided recording, whether the double-sided recording, or subsequent reading from the disc 102, takes place from the same side of the disc or from both sides. The pickup assembly 108 and the motor 106 are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path 170.

The control section 120 comprises a control central processing unit (CPU) 122 and a navigation data update circuit 126. The control CPU 122 supplies a first input signal to the navigation data update circuit 126, and the servo 110 supplies a second input signal to the navigation data update circuit 126. The servo 110 can also be considered part of the control section 120. For purposes of improved trick mode performance, the navigation data update circuit 126 will generate navigation data to be stored on the disc 102 with the video data.

The navigation data update circuit 126 supplies a first input signal to a navigation pack buffer 152, which forms part of the video/audio input processing path 140. This input signal from the navigation data update circuit 126 can update the navigation data contained in the video signal as the video signal propagates through the navigation pack buffer 152. Specifically, the input signal from the navigation data update circuit 126 is used to provide video object units (VOBU) contained in the video signal with the forward addresses of other preselected VOBU's. This process of storing the addresses of several other preselected VOBU's in each VOBU enables the device 100 to make the jumps required for performing trick modes. In addition, providing each VOBU with these addresses increases the versatility of the disc 102 thereby allowing a viewer to perform trick modes during playback of the disc 102 on DVD recorders or DVD players manufactured by different companies.

Once the VOBU's have received their forward address information, the VOBU's are directed to a writing buffer 154. The writing buffer 154 can store the incoming video data as the device 100 reads data from the disc 102 and positions the pickup assembly 108 for the next reading or writing step. Once the pickup assembly is in place to write data, the writing buffer can begin to send the video data to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and writing buffer 154 as shown in FIG. 1. The control CPU 122 can delete, modify, and reformat video data stored in the track buffer 172 and writing buffer 154. Control and data interfaces are also preferably provided for permitting CPU 122 to control the operation of packet video encoder 144, audio encoder 148 and navigation pack generator 149. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, slow play, jump, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises and NTSC decoder 142 and video encoder, for example MPEG-1 or MPEG-2, 144 for video in, and comprises an audio analog-to-digital converter (A/D) 146 and an audio encoder, for example MPEG AC3 or DTS, 148. In addition, input processing path 140 includes a navigation pack generator 149. The navigation pack generator 149 supplies navigation data to the incoming digitized video and audio packet data. The digitized video and audio packet data and the navigation data are combined in a multiplexer 150 to create the VOBU's. The VOBU's are temporarily stored in the navigation pack buffer 152, which enables each VOBU to receive from the navigation update circuit 126 future address information regarding a predetermined number of other VOBU's.

The output processing path 170 comprises error correction block 130 and a track buffer, or output buffer, 172, in which data read from the disc 102 is temporarily stored for further processing. This data is processed by conditional access circuit 174 that controls propagation of the data through demultiplexer 176 and into respective paths for video and audio processing.

The video is decoded by decoder 178, for example from MPEG-1 or MPEG-2, and encoded as a conventional television signal, for example NTSC or PAL by TV Encoder 180. The audio is decoded by circuit 182, for example from MPEG-3 AC3 or DTS, and converted to analog form by audio digital-to-analog (D/A) converter 184. A PCI buffer 190 and PCI decoder 192 can be provided for decoding presentation control information contained in navigation packets contained on the disc 102. The output processing path 170 can be deemed to include the error correction circuit 130, as noted. In addition, a DSI buffer 186 can be provided for receiving disc search information (DSI) contained within the navigation packets. A DSI decoder 188 can be used for decoding the DSI information contained within navigation packets read from the disc 102.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
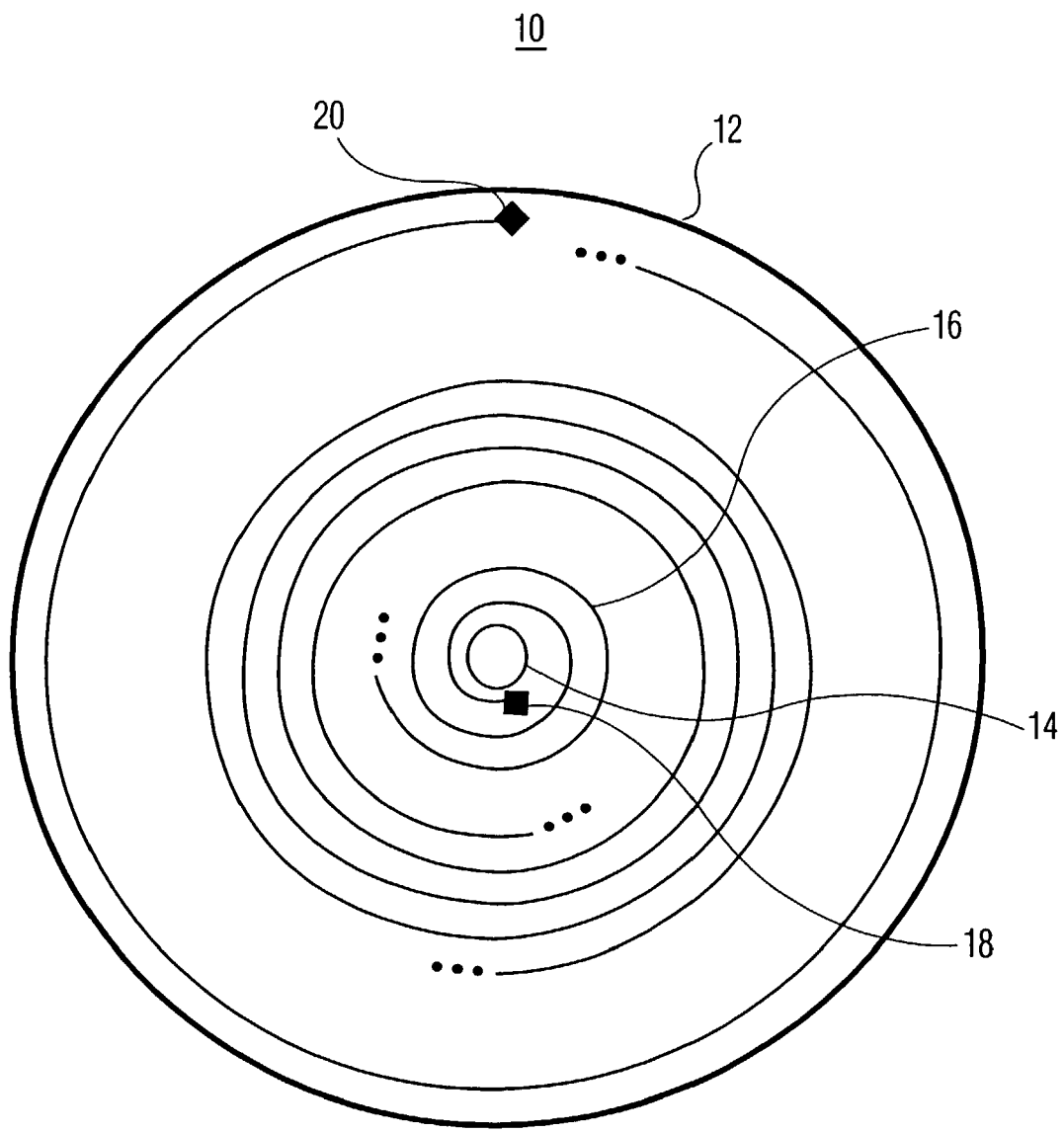
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (___) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

The inventive arrangements have been described herein relative to recordable DVD media. Those skilled in the art will appreciate, however, that the invention is not limited in this regard. Rather, the improvements to DVD navigation information for improved trick modes as described herein can be used with any type of disc media, including but not limited to DVD-R type media.

DVD Data Structures

Figure 3:
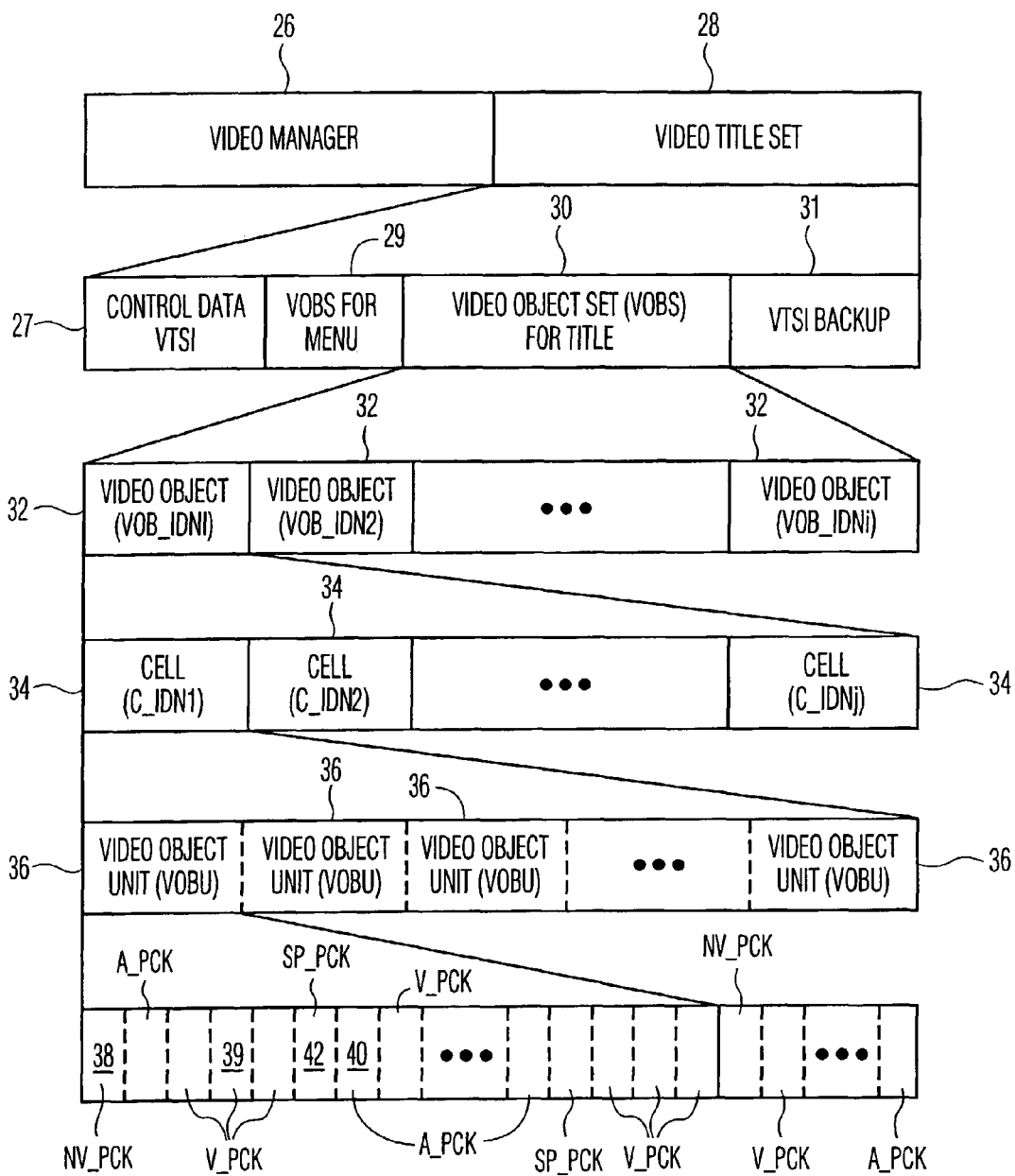
FIG. 3 is a diagram useful for explaining the organization of video object units in video object sets.

As shown in FIG. 3, each DVD contains a video manager 26 and video title set (VTS) 28. The VTS includes video title set information (VISI) 27, an optional video object set for menu 29, one or more VOBS for title 30 which contains the actual title content, and a VTSI backup 31. Each VOBS 30 is comprised of a plurality of video objects 32. Each video object 32 includes a plurality of cells 34. Each VOBS also includes a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBU's 36. Each of the VOBU's 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of the following kinds of packs, including video packs (V_PCK) 39, audio packs (A_PCK) 40 and sub-picture packs (SP_PCK) 42. Each VOBU is nominally comprised of one group of pictures (GOP).

Reducing User Response Time During Simultaneous Recording and Playback

According to the inventive arrangements, user response time during simultaneous recording and playback of video in a recordable disc medium device can be reduced by controlling the flow of video data to a writing buffer located in the disc medium device. Specifically, the flow of video data to the writing buffer can be controlled by selectively pausing the transfer of VOBU's to the buffer if it is determined that the buffer is in danger of overflowing during a reading step. These VOBU's can be stored in a navigation pack buffer until the writing buffer can be emptied during the next writing step. This process prevents the writing buffer from overflowing and allows the disc medium device to extend the reading step to initiate a trick mode or program jump thereby reducing user response time.

Figure 4:
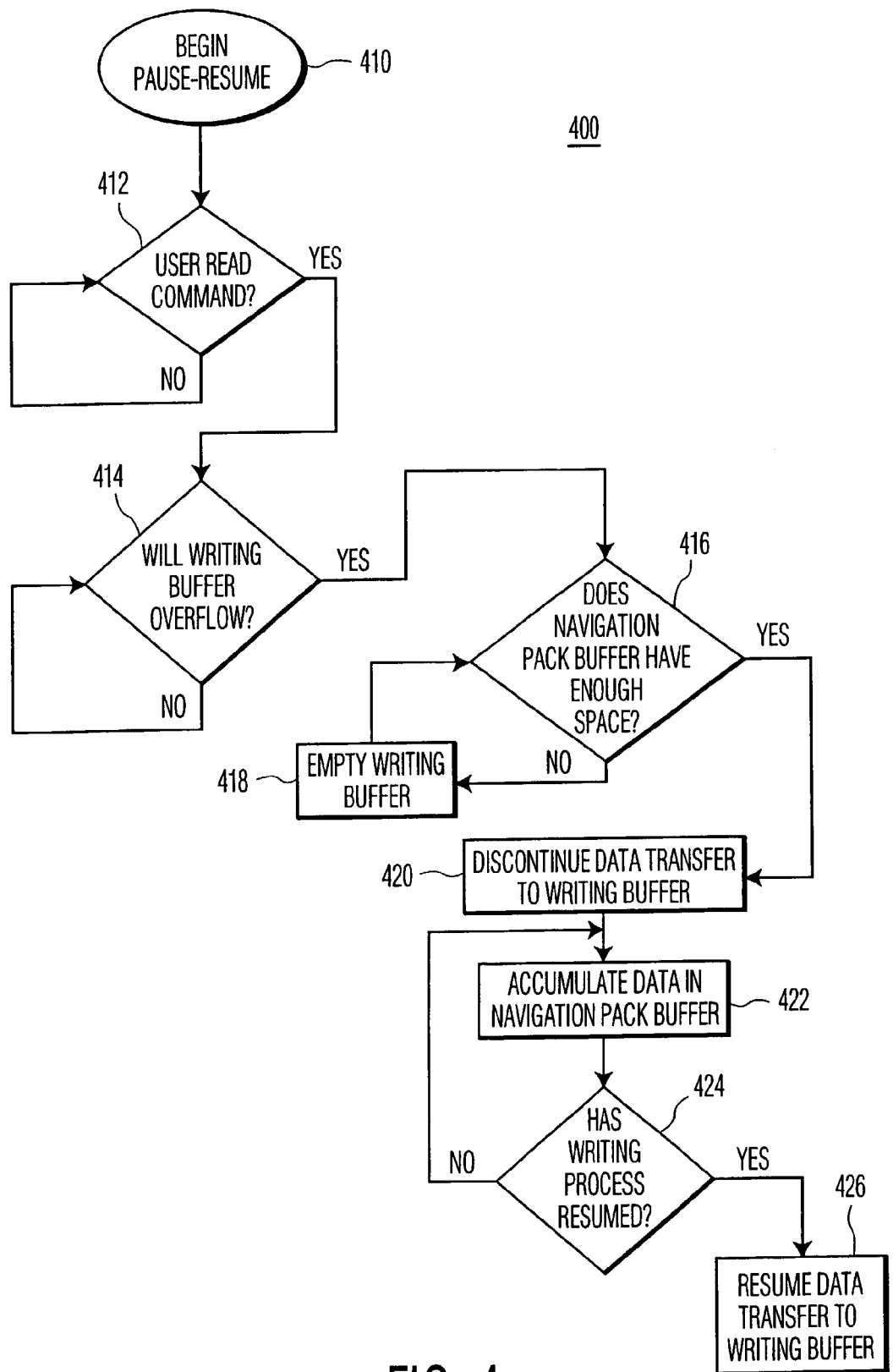
FIG. 4 is a flow chart useful for explaining the inventive arrangements herein.

FIG. 4 shows a flowchart 400 that illustrates the operation of the present invention. At step 410, a pause-resume mode is initiated. At this point, the device 100 is simultaneously recording and playing back video data. If the device receives a user read command such as a trick mode in step 412, then the CPU 122 can determine whether performing the trick mode will cause the writing buffer 154 to overflow, as shown in step 414. If there is a possibility that overflow will occur and the navigation pack buffer 152 contains enough space to store the additional VOBU's as shown in step 416, then the CPU 122 can instruct the buffer 152 to temporarily pause the transfer of additional VOBU's to the writing buffer 154, as shown in step 420. In accordance with step 418, if the navigation pack buffer 152 does not have enough space to store the additional VOBU's, then the device 100 can empty the writing buffer 154 to prevent buffer overflow. Once the transfer of VOBU's to the writing buffer 154 is paused and if the navigation pack buffer 152 has enough space, the additional VOBU's can be temporarily stored in the buffer 152 in accordance with step 422.

In order to accommodate the additional VOBU's that are stored in the navigation pack buffer 152 during this pausing step without increasing the size of the navigation pack buffer 152 beyond that required in conventional DVD recorders, it is desirable to reduce the number of VOBU's required to be in the buffer for the forward address updating process. One way this can be done is by reducing the number of actual forward addresses necessary to complete the navigation data for each VOBU.

Figure 5:
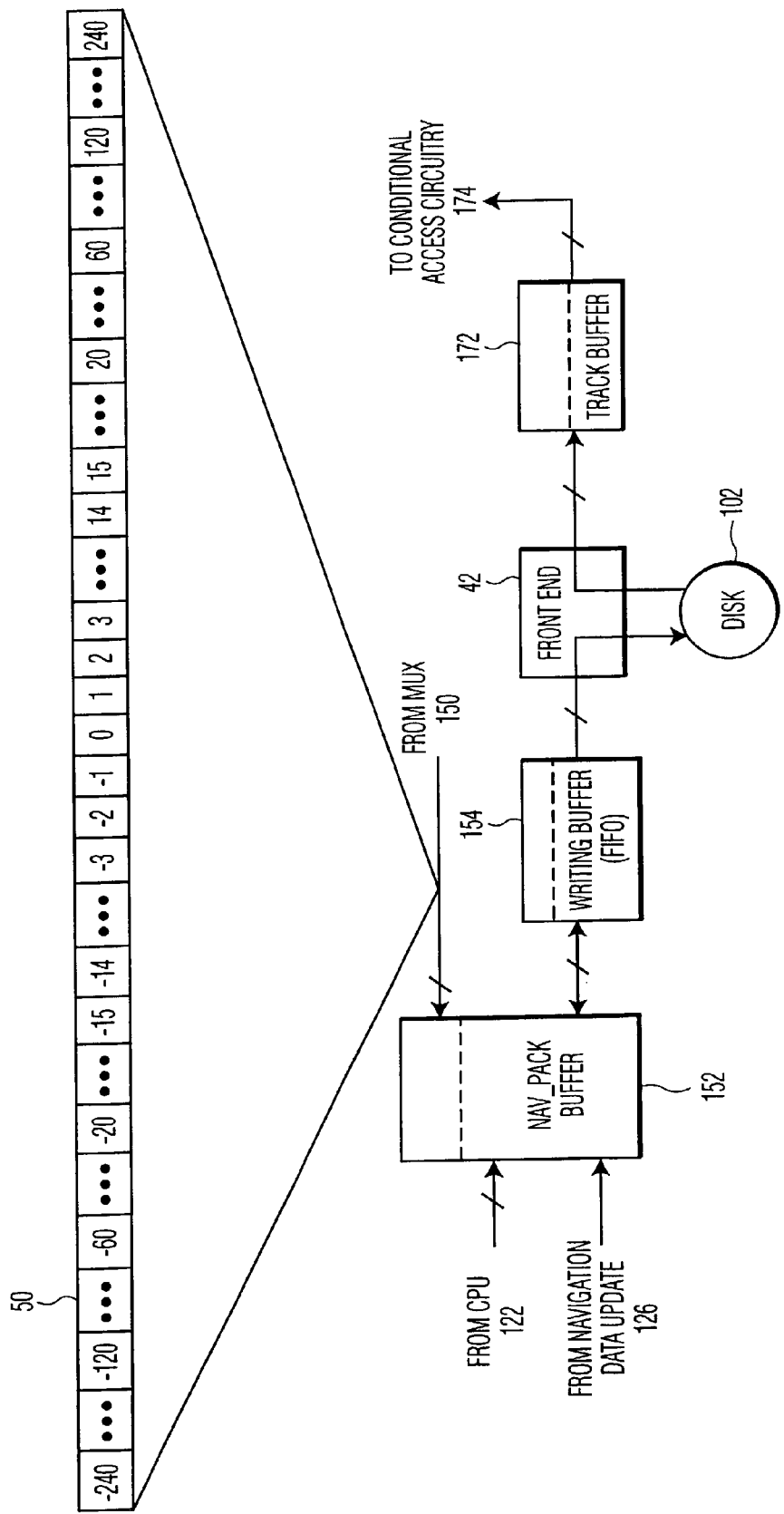
FIG. 5 illustrates a close-up view of a portion of the input and output processing paths of FIG. 1 useful for explaining the inventive arrangements herein.

FIG. 5 illustrates a portion of the input and output processing paths of FIG. 1 and a typical video data stream 50 containing a number of VOBU's. VOBU 0 represents the VOBU currently being updated with forward address information. The negative numbers in video data stream 50 represent VOBU's that were created prior to VOBU being formed. Conversely, the positive numbers represent VOBU's that are created subsequent to VOBU 0 being formed. For purposes of optimal trick mode performance, it is desirable to place in the navigation pack of VOBU 0 the addresses of the following forwardly located VOBU's: VOBU's +1 through +15, +20, +60, +120 and +240.

Since each VOBU contains roughly one-half second of video, the navigation pack buffer 152 would need to store over two minutes worth of video, or 240 VOBU's, to allow VOBU 0 to receive this forward address information. Such a high capacity buffer, however, would increase the expense of the device 100 and cause a delay of approximately two minutes before the disc 102 could be ejected at the end of a recording session. Thus, it is desirable to decrease the storage capacity demands placed on the navigation pack buffer 152 to overcome these problems and at the same time to keep the capacity high enough to enable the VOBU's to receive a sufficient amount of forward address information. In addition, navigation pack buffer 152 should be large enough to store the additional VOBU's that may be prevented from entering the writing buffer 154 during a trick mode or other user initiated read commands. According to the inventive arrangements, a navigation pack buffer of conventional size can preferably be used for this purpose.

It has been determined that providing the current VOBU with a relatively limited amount of forward address information does not affect trick mode performance too severely. For example, if VOBU 0 is provided with only the addresses of subsequently created VOBU's +1 through +15 and +20, the device 100 or other DVD recorders or players can still perform relatively slower fast-forward modes during playback of the disc 102. Further, if the only forward addresses that are provided to VOBU 0 are the addresses of VOBU's +1 through +15 and +20, then the navigation pack buffer needs only to store 21 VOBU's (VOBU 0+VOBU's +1 through +15 and VOBU +20) to perform the updating process. Thus, the navigation pack buffer 152 is required to hold far fewer VOBU's for purposes of the forward address updating process.

Since fewer VOBU's need to be stored for the foregoing process, the navigation pack buffer 152 now has additional space available for storing the VOBU's that may be prevented from entering the writing buffer 154 during the extended reading step. Moreover, this process does not affect the address information associated with the VOBU's that were created before VOBU 0 was formed, as this information remains readily available.

Although trick modes can be sufficiently performed with the VOBU's containing only a limited number of the forward addresses typically required for such a process, the remaining forward address spaces are preferably not left empty. The navigation data update circuit 126 can insert dummy data into each VOBU to complete each VOBU's navigation pack. For example, VOBU 0 can contain the forward addresses of VOBU's +1 through +15 and +20; however, update circuit 126 can insert dummy data for the forward VOBU addresses of VOBU's +60, +120 and +240.

In order to ensure that the dummy forward VOBU address data does not create a problem during certain trick mode operations, it is preferable to decrease the size of the cells that contain the VOBU's. Advantageously, if a cell is reduced in size, then the amount of video and the number of VOBU's contained in the cell are correspondingly decreased as well.

In one arrangement, the amount of video contained in each cell is preferably limited to less than 30 seconds. Since each VOBU contains roughly one-half second of video, each cell can contain less than 60 VOBU's. This reduces the amount of actual forward address information required to complete each VOBU. In addition, any unknown forward addresses can be filled in with dummy data. For example, if the amount of video in a particular cell is limited to 29.9 seconds, VOBU 0 will not need the forward addresses of VOBU's +60, +120 and +240 since these VOBU's will be located in a different cell. VOBU 0 only needs the addresses of VOBU's +1 through +15 and +20 for purposes of completing the navigation data associated with the forward addresses. The remaining forward address slots for VOBU's +60, +120 and +240 are filled with dummy data. Under this arrangement, the dummy data will not affect the positioning of the pickup assembly 108. This is because the CPU 122 can recognize that these VOBU's are in another cell, and the CPU 122 can prevent the pickup assembly 108 from jumping ahead to the +60, +120 or +240 VOBU's based on the incorrect address information in the dummy data. As a result, the navigation pack buffer 152 can limit its storage requirement to 21 VOBU's for purposes of updating VOBU 0. It should be noted, however, that the invention is not limited to the specifications listed thus far. For example, each cell can contain more than 30 seconds of video and each VOBU can accordingly be provided with whatever actual forward address information is available. In addition, the size of the navigation pack buffer 152 can accordingly be increased to accommodate the need for storing a greater number of VOBU's due to the larger cell size.

Although it is preferred to limit the number of VOBU's in the navigation pack buffer to 21 at any one time, the actual capacity of the buffer 152 can be determined by the maximum bit rate of the incoming bitstream carrying the VOBU's. This bitstream is typically limited to roughly 8.35 Mbits/sec in conventional DVD recorders but can reach higher levels. At 8.35 Mbits/sec, the amount of video data in 21 VOBU's is approximately 11 Mbytes. Therefore, the capacity of the navigation pack buffer 152 in conventional DVD recorders can be around 11 Mbytes to accommodate the VOBU's at the maximum bitstream rate. During normal operation, however, the bitstream rate is typically lower than the maximum rate. In fact, the average bit rate is normally 4.5 Mbits/sec and in some cases, the bitstream rate can be as low as 2.0 Mbits/sec. As a result, the navigation pack buffer 152 typically contains a significant amount of unused memory, which can be used to store the VOBU's that can accumulate during an extended reading step. It should be noted, however, that the invention is not limited to the capacities discussed above as other navigation pack buffer 152 capacities may be used.

Turning back to the flowchart 400 of FIG. 4, the additional VOBU's can accumulate in the navigation pack buffer 152 until the DVD device resumes a writing step, as shown in step 424. In accordance with step 426, the CPU 122 can instruct the navigation pack buffer 152 to resume transferring the VOBU's to the writing buffer 154.

Referring back to FIG. 5, once the VOBU's are received by the writing buffer 154, the VOBU's can be sent to the front end 42, which can contain the error correction coding circuit 128, the error correction circuit 130 and the pickup assembly 108 of FIG. 1. The VOBU's can then be recorded onto the disc 102. Data read from the disc 102 can be temporarily stored in track buffer 172 where it can then be sent to the conditional access circuitry 174.

The capacity of the writing buffer 154 in conventional DVD recorders is typically around 2.1 Mbytes. During simultaneous recording and playback, or pause-resume mode, this gives the device 100 roughly two seconds to move the pickup assembly 108 into the proper reading position, read a portion of data and then move the pickup assembly 108 back to perform another writing step. Of course, the invention is not limited in this regard, as the size of the writing buffer can be increased or decreased.

In one arrangement of the present invention, the incoming bit rate can be lowered if either the writing buffer 154 or the navigation pack buffer 152 is in danger of overflowing. If the incoming bit rate is too high, the control CPU 122 can instruct the packet video encoder 144 of FIG. 1 to reduce the bit rate of the incoming video signal. Reducing the bit rate can affect picture quality; however, at high bit rates, this reduction in picture quality is not very discernable and is acceptable for purposes of trick mode playback. For example, reducing the maximum bit rate of approximately 8.35 Mbits/sec by about 10% does not significantly degrade picture quality.

Figure 6:
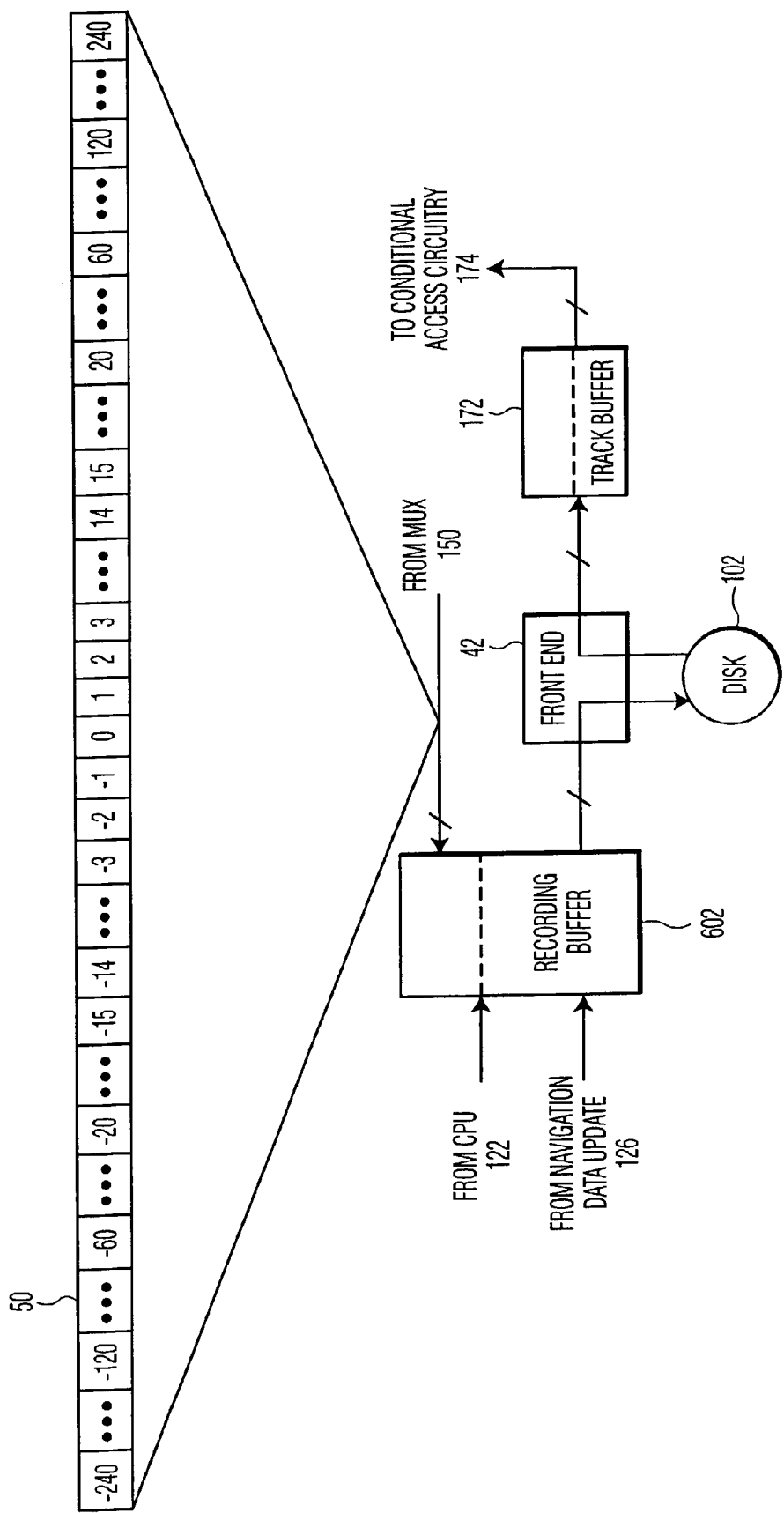
FIG. 6 illustrates an alternative arrangement of the portion of the input processing path shown in FIG. 5 in accordance with the inventive arrangements herein.

FIG. 6 illustrates an alternative arrangement of the present invention. In this embodiment, the navigation pack buffer 152 and the writing buffer 154 of FIG. 5 can be logically combined to form a single data storage medium 602. The basic operation of the data storage medium 602 is similar to the operation of the navigation pack buffer 152 and the writing buffer 154 as explained in FIG. 4 and FIG. 5. That is, if the portion of the data storage medium 80 that is used to store the VOBU's ready to be recorded onto the disc 102 reaches its capacity during a pause-resume mode and a user read command is initiated, then these VOBU's can be temporarily stored in the portion of the storage medium 80 used for updating the address information for the VOBU's. The VOBU's can be stored in this portion until the writing step resumes, and the portion of the storage medium 80 that stores these VOBU's begins to empty. This process permits the device 100 to immediately begin the user read command thereby reducing the user response time. In addition, this arrangement reduces the bus load of the device 100 and reduces the overall complexity of the system.

The invention claimed is:

1. A method for controlling simultaneous playing back and recording of data onto a disc medium, the method comprising the steps of:
    storing in a writing buffer video object units intended for recordation on the disc medium;
    supplying navigation pack data to said writing buffer from a navigation pack buffer;
    responsive to a user-generated pause-resume command, firstly buffering a plurality of video object units in said writing buffer;
    recording said plurality of video object units buffered in said writing buffer onto said disc medium;
    selectively pausing the buffering step to prevent a data overflow of said writing buffer; and
    during the pausing step, secondly buffering additional video object units in said navigation pack buffer to prevent loss of said additional video object units.

2. The method according to claim 1, further comprising the step of recording said plurality of additional video object units secondly buffered in said navigation pack buffer onto said disc medium.

3. The method according to claim 2, further comprising shrinking a size of one or more cells containing said plurality of video object units thereby reducing the capacity requirements of said navigation pack buffer.

4. The method according to claim 3, further comprising lowering a bit rate of said video object units to prevent overflow of said writing buffer or said navigation pack buffer.

5. The method according to claim 1 wherein said writing buffer and said navigation pack buffer are provided as a single data storage medium.

6. The method according to claim 5 wherein said writing buffer and said navigation pack buffer are logically combined.

7. The method according to claim 1 further comprising the steps of:
    buffering said firstly buffered plurality of video object units in a writing buffer; and,
    buffering said secondly buffered additional video object units in a navigation pack buffer.

8. The method according to claim 2 further comprising the steps of:
    buffering said firstly buffered plurality of video object units in a writing buffer; and,
    buffering said secondly buffered additional video object units in a navigation pack buffer.

9. An apparatus for simultaneous playing back and recording of data onto a disc medium, comprising:
    a writing buffer for firstly buffering a plurality of video object units to be recorded onto said disc medium, wherein said writing buffer responsive to a pause-resume command firstly buffers said plurality of video objects therein, said plurality of video objects to be recorded on said disc medium;
    a navigation pack buffer supplying navigation pack data to said writing buffer for buffering video object units requiring future data address information;
    control circuitry for selectively pausing the transfer of additional video object units to said writing buffer to prevent overflow of said writing buffer; and
    excess memory contained in said navigation pack buffer secondly buffering said additional video object units to prevent loss of said additional video object units.

10. The apparatus according to claim 9 wherein said control circuitry resumes transfer of data from said navigation pack buffer to said writing buffer after resumption of a disc writing process.

11. The apparatus according to claim 10 wherein a size of one or more cells containing said plurality of video object units is reduced thereby reducing the capacity requirements of said navigation pack buffer.

12. The apparatus according to claim 11 wherein said control circuitry lowers a bit rate of said video object units to prevent overflow of said writing buffer.

13. The apparatus according to claim 11 wherein said writing buffer and said navigation pack buffer are provided as a single data storage medium.

14. The apparatus according to claim 13 wherein said writing buffer and said navigation pack buffer are logically combined.

15. The apparatus according to claim 9 wherein said writing buffer and said navigation pack buffer are provided as a single data storage medium.

16. The apparatus according to claim 15 wherein said writing buffer and said navigation pack buffer are logically combined.

* * * * *